350-269 CROSS REFERENCE SEARCH ROOM

INCREMENTAL CODE BLOCK APPARATUS

Filed Oct. 12, 1964 2 Sheets-Sheet 1

INVENTORS
NORMAN R. TIMARES
ONNI W. NIEMI
BY Allen E. Botney
ATTORNEY

INVENTORS
NORMAN R. TIMARES
ONNI W. NIEMI
BY Allen Z. Botney
ATTORNEY

United States Patent Office 3,365,714

Patented Jan. 23, 1968

3,365,714

INCREMENTAL CODE BLOCK APPARATUS

Norman R. Timares, Los Angeles, and Onni W. Niemi, Canoga Park, Calif., assignors to FMA Inc., Los Angeles, Calif., a corporation of California Filed Oct. 12, 1964, Ser. No. 403,049
8 Claims. (Cl. 340—347)

The present invention relates in general to information storage and retrieval systems and more particularly relates to apparatus for converting binary coded data from one format to another.

A document is simply a source of information. As such, it can take many different forms. It can be handwritten, typed, printed, drawn, painted or photographed. Whatever form the documents happen to take, their usefulness depends on two important and related questions, namely, can the information be stored easily (storage) and can the information be expeditiously obtained when it is needed (retrieval). One of the more convenient and economical ways of storing documents to which fast and frequent access is desired is to reduce the documents greatly in size by photographing them. The photographed documents, together with indexing information that describes them, are then stored as reels of film, one document and its associated block of indexing information generally being stored in each film frame of the reel. The indexing information, which describes the document for retrieval purposes, is recorded on an area alongside the area on which the document is recorded, and is customarily in binary-coded form. In retrieving a particular document, the descriptive index associated with that document is punched in binary-coded form on a request card. The descriptive index blocks on the film are then optically scanned in succession, a comparison being made between each descriptive index as it is scanned and the punched data on the card. The requested document is retrieved when a match exists between the blocks of code compared.

One of the problems encountered in this field of information storage and retrieval is that of transferring documentary information from one system to another. For one reason or another it may be necessary or desirable to transfer this information. The problem arises due to the fact that the format of the indexing data in the first system is materially different from the format of the indexing data in the second system, which is to say that the blocks of code respectively identifying the recorded documents materially differ from each other in appearance and arrangement. Consequently, it has heretofore been a difficult and laborious and, therefore, costly proposition to transfer such information from one system to another. Accordingly, there has been a long-felt need for some apparatus that would automatically convert code in one format to code in another and more desirable format and thereby facilitate and expedite the conversion process.

The present invention provides a solution to these earlier difficulties and it does so by providing a converter apparatus that produces the desired format of binary-coded data in response to electrical pulses that represent or correspond to the data in the original indexing format. Stated differently, instead of laboriously converting or transforming the essential indexing data manually, it is within the concept of the present invention to automate the conversion by first "reading out" the data in its original arrangement to produce a corresponding sequence of electrical pulses and then using these signals to reproduce the same data but arranged in the desired format. The essence of the present invention is in the means by which the desired format of code is obtained from the signals.

More particularly, in accordance with the present invention, an apparatus is provided in which criss-crossing rods are mounted with holes through them at the points where they cross each other. These holes, although superimposed, are not normally in alignment, that is to say, they are not oriented so that light will pass through them. However, the rods are movably mounted, either by rotation or by linear displacement, so that the holes can be brought into alignment or into proper orientation and means are included in the apparatus for doing so on a selective basis, the means being operable in response to the above-mentioned electrical signals. An appropriate light source is mounted either above or below the block of rods to supply the needed light. Thus, by means of this apparatus, an original format of code can be rearranged into a more desirable pattern simply by feeding the apparatus at suitable feed-in points with the signals corresponding to the original code. By adding further elements to this basic apparatus, as will more clearly be seen below when the invention is described in detail, the desired pattern of code can be refined still further prior to recordation on the film on which the documentary information is to be or has been stored.

The advantages of such an apparatus are obvious. Briefly stated, it greatly facilitates and expedites the process of converting or transforming binary-coded indexing data from one format to another. In this respect, therefore, the time and expense heretofore required are considerably reduced. A further advantageous feature of a device of this sort is that it minimizes, if not entirely eliminates, manual steps from the actual conversion operation, with the result that the possibility of error due to the human element is substantially eliminated. In addition, the same device, without any difficulty, can be utilized to transform any number of coded formats to the desired format.

It is, therefore, an object of the present invention to provide electro-optical apparatus for transforming code in one format to the same code in another format.

It is another object of the present invention to provide the means by which a block of code arranged in one format is electro-optically transformed into a block of code arranged in an entirely different format for recordation on film.

It is a further object of the present invention to provide an apparatus by means of which blocks of code respectively arranged in different formats may be transformed into a corresponding number of code blocks arranged in the same format.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only and are not intended as a definition of the limits of the invention.

FIGURE 1 illustrates a frame of film on which are recorded a document and a block of code having the format herein involved describing that document;

FIGURE 2 presents a schematic diagram of a preferred embodiment of the present invention;

Figure 1:
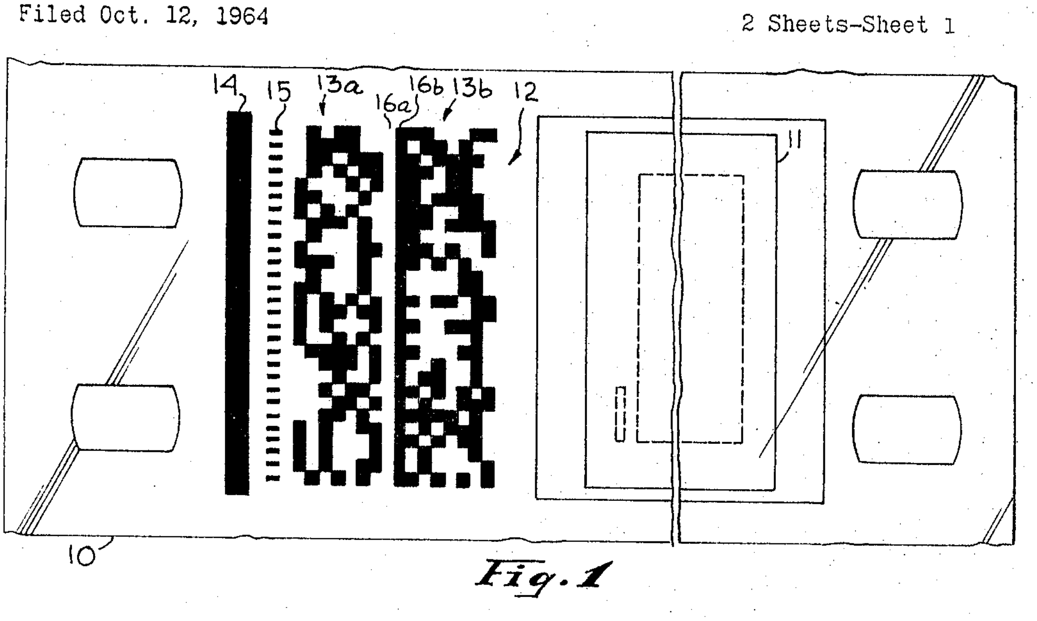

Reference is now made to the drawings and in particular to FIGURE 1 therein wherein a frame of film 10 is shown on which a document 11 is recorded in one area of the film and an indexing block of code describing or identifying the document, generally designated 12, is recorded alongside the document in a second area on the film. The code block is divided into two main sections generally designated 13*a* and 13*b* and, in the particular code block being illustrated in this figure, which, it should be mentioned, is being illustrated merely by way of example, each of these sections contains twenty-eight horizontal rows of binary code, one row above the other, each of said rows containing seven binary bits. The binary bit areas here are square-shaped and, in order to represent the "zero" and "one" digits of the binary code, they are either translucent or opaque. As shown, the rows of code as well as the square-shaped binary bit areas in each row are contiguous to each other or, stated differently, abut one another, thereby producing a highly compact code block in which a maximum amount of data is recorded for the area involved. Moreover, it can be seen from an examination of the code block that the square-shaped areas are lined up to form seven columns of them in each of the abovesaid sections, with the result that each section is a rectangle having seven times twenty-eight square-shaped areas in it.

To the left of section 13*a*, there is a relatively long vertical bar 14 called a frame marker, as was previously mentioned. As film passes through the retrieval unit in an information storage and retrieval system and is optically scanned, this bar tells the unit that it has encountered a new frame of film and that it now has a page of code to read. It is also utilized for timing or synchronization purposes. Between frame marker 14 and code section 13*a*, there is a series of short horizontal bars called timing marks or flags, such as timing mark 15. These tell the machine that it is at the beginning of a particular line or row of code in the code block and, therefore, that a row of code should be "read out." Consequently, there are as many timing marks 15 as there are rows of code, twenty-eight of them in the code block illustrated in FIG. 1. As may be seen from the figure, timing marks 15 are preferably positioned substantially midway between frame marker 14 and code section 13*a* and are preferably narrower than the binary bit areas therein.

Separating code block sections 13*a* and 13*b* are a pair of vertical bars respectively designated 16*a* and 16*b*, one of them being translucent and the other being opaque. In the figure, the left-hand bar, namely, vertical bar 16*a*, is translucent and the right-hand bar, namely, vertical bar 16*b*, is opaque, but the reverse could also be true. Bars 16*a* and 16*b*, as well as frame marker 14, are used to periodically synchronize or phase the scan circuitry in the information storage and retrieval system.

The code block just described in connection with FIG. 1 is the block of code to which it is desired to convert or transform other blocks of code having different arrangements or formats, and it is this end that this invention and apparatus constructed in accordance therewith is intended to achieve. With this in mind, reference is now made to FIG. 2, wherein a top view of a preferred embodiment of the invention is illustrated, the illustration being partly in schematic form for sake of clarity and convenience at this point. As shown therein, it includes a set of "row" magnets 20 and a set of "column" magnets 21, both the row and column magnets being connected to electronic pulse circuitry 22. Magnets 20 and 21 are electromagnets and, therefore, it is the coils wound thereon that are electrically connected to electronic pulse circuitry 22.

The aforesaid electronic pulse circuitry is not a part of the subject invention but it should be mentioned nevertheless that it appropriately applies the necessary electrical pulses to the above said magnets in order to activate them to effect the desired code format conversion or transformation. As was previously mentioned, these electrical pulses correspond to the original indexing code, whose format is being converted and they are obtained by scanning, in one manner or another, the medium on which the orignial code is recorded. A punched IBM card is an example of such original code and its format, and it would be obvious to those skilled in the art that the code on such a card may be sequentially scanned or read out by electro-optical means to produce a proper and corresponding electrical pulse sequence.

Referring once again to FIG. 2, the apparatus therein further includes an optical integrator block, generally designated 23, the integrator block being a block of square-shaped optical rods that is divided into two groups or sections designated 23*a* and 23*b*. The rods in either of sections 23*a* and 23*b* are individually coated with a thin film of material that will prevent loss of light from the rods and, therefore, will prevent "cross-talk" between them. For example, the rods may be aluminized. In addition, the rods in each of the sections are cemented together to form a solid unit or package. As will be more clearly understood later, the code block 12 recorded on film frame 10 in FIG. 1 is obtained as a result of the light selectivity passed through the different elements of the optical integrator block 23 in FIG. 2. Needless to say, therefore, integrator block 23 has the same configuration or appearance as the already-described block of code. In this respect, since the particular block of code presented in FIG. 1 is basically divided into two sections, namely sections 13*a* and 13*b*, with each section having twenty-eight rows of binary code arranged to form seven columns, integrator block 23 is likewise divided into sections 23*a* and 23*b* with each of these sections having twenty-eight rows of square-shaped optical rods, seven of these rods in each row, the rows being arranged so as to also form seven columns of these rods. Hence, the cross-section of each of the above sections is a rectangle having twenty-eight rods on one side and seven rods on the other side.

Cemented between sections 23*a* and 23*b* is a sandwich arrangement of an optical plate or bar 23*c*, such as glass, that will pass or transmit light easily from one end to the other, and a plate or bar 23*d* made of an opaque material, such as metal. Another such opaque bar, 23*e*, is cemented to section 23*a* at the left or free side thereof, bar 23*e* having narrow rectangularly-shaped openings 23*f* through it in which are respectively mounted identically-shaped optical rods of the kind previously mentioned. These rods in openings 23*f* pass the light that ultimately produces flags or timing marks 15 in FIG. 1 and, therefore, these rods have the same shape and dimensions and are spaced from each other the same as the timing marks. Consequently, there are as many of these rectangular-shaped rods as there are rows of code in the integrator block, twenty-eight of them in the particular integrator block being discussed, and they are spaced from each other so as to be in alignment with these rows. It will also be noticed from the figure that openings 23*f* and the optical rods therein are arranged in a single column that is subtantially midway between the sides of plate 23*e* and parallel to the columns of sections 23*a* and 23*b*. Finally, an optical plate or bar 23*g* is cemented to opaque plate or bar 23*e* at the left or free side thereof, plate 23*g* being slightly longer than plates 23*c* and 23*d* and, therefore, it extends slightly above and below sections 23*a* and 23*b*. As will be seen later, plate 23*g* is used to produce frame marker 14 of FIG. 1.

Figure 2:
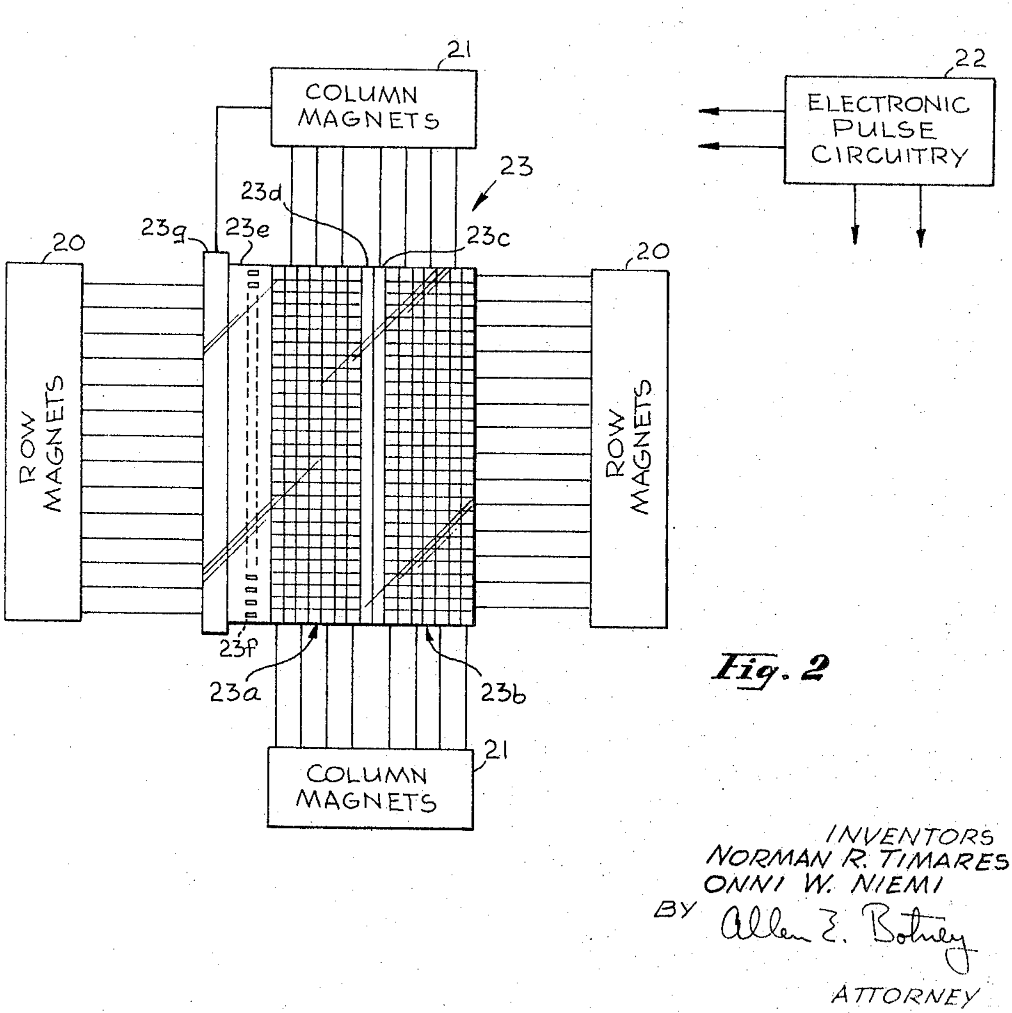

The film on which the documents and their associated blocks of indexing code are recorded, as is illustrated in FIG. 2, is placed up against the output face of integrator block 23, the output face being the top view of the block shown in FIG. 2, and as light emerges from it in a pattern, as previously described, it strikes the film to thereby record the code thereon in the desired format.

The mechanism or apparatus by means of which light is supplied to the various elements of integrator block 23 in response to signals from pulse circuitry 22 is positioned beneath the integrator block in FIG. 2 and, consequently, is hidden from view. Accordingly, reference is now made to FIGS. 3 and 3A wherein front and side views of this mechanism are respectively presented, the integrator block 23 also being shown in proper relation to it.

The aforesaid mechanism basically includes a source of light 24 above which and spaced from each other are a pair of masking plates respectively designated 25 and 26. These plates are parallel to each other and they have identical patterns or arrangements of holes through them, such as holes 25*a* and 26*a*, with the holes through one plate being in registration with the holes through the other plate. As a result and ignoring for the moment a consideration of the elements positioned between plates 25 and 26, light from light source 24 can freely pass through the holes in plates 25 and 26 to the integrator block. The holes through each plate are arranged in a pattern of columns and rows that corresponds to the pattern in which the rods, plates and bars of the integrator block are arranged.

More specifically, through each plate there are as many columns and rows of holes as there are columns and rows of optical rods in sections 23*a* and 23*b* of the integrator block. In addition, each plate also has columns and rows of holes through it in connection or association with optical bars 23*c* and 23*g* as well as in connection or association with the optical rods in openings 23*f*. Thus, for the specific integrator block described here by way of example, each of plates 25 and 26 has 17 columns of holes through it arranged in twenty-eight rows, the columns and holes through one plate respectively being in registration with the columns and rows of holes through the other plate, as was previously mentioned. By way of analogy, it may be said that the arrangement or format of the holes through the two plates resemble the arrangement or format of the optical rods and bars of the integrator block.

Mounted between masking plates 25 and 26 are two layers of criss-crossing rods 27 and 28, with rods 27 hereinafter being referred to as the "row" rods and rods 28 being referred to hereinafter as the "column" rods. In layer 28 there are as many "column" rods as there are columns of optical rods in sections 23*a* and 23*b* of integrator block 23. Similarly, in layer 27, there are as many "row" rods as there are rows of optical rods in the integrator block. In addition to the above, layer 28 also includes two "column" rods in connection or association with optical plates or bars 23*c* and 23*g*. Hence, in the illustrated apparatus, there are included a total of sixteen "column" rods 28 and a total of twenty-eight "row" rods 27, with the "row" rods preferably being oriented at right angles to the "column" rods therebeneath. Furthermore, "row" rods 27 are respectively positioned so as to be in alignment with the rows of optical rods in integrator block 23 and, similarly, "column" rods 28 are respectively positioned to be in alignment with the columns of optical rods in sections 23*a* and 23*b* of the integrator block as well as in alignment with the optical bars or plates 23*c* and 23*g* therein. It is thus seen that in the preferred arrangement, there is a "row" rod 27 for each row of optical rods in integrator block 23 and, except for the column of optical rods in openings 23*f*, there is also a "column" rod 28 for each column of optical rods in the integrator block as well as a "column" rod for each of optical bars 23*c* and 23*g*.

Figure 3:
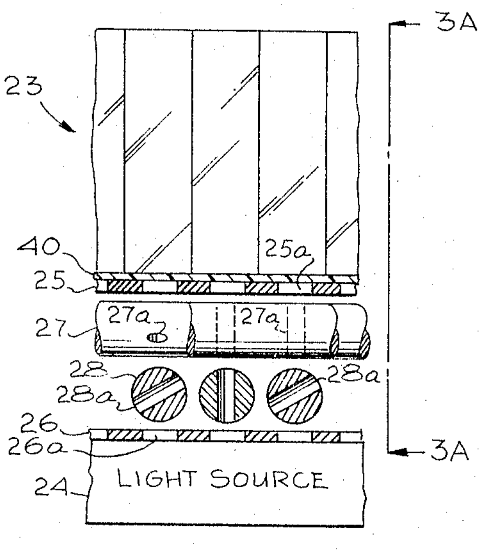
FIGURE 3 is a front view of a portion of the FIG. 2 embodiment and illustrates the features thereof in detail.
Figure 3A:
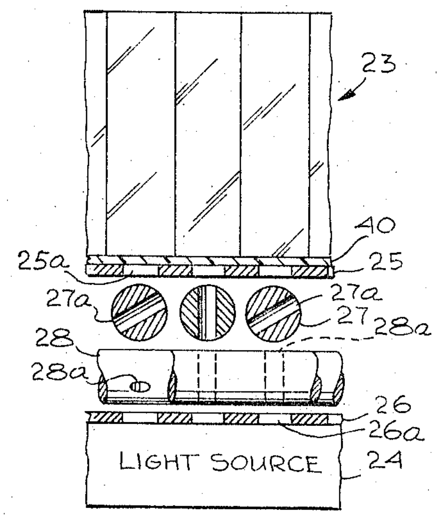
FIGURE 3(A) is a side view of the apparatus illustrated in FIG. 3.
Figures 4, 5, 6:
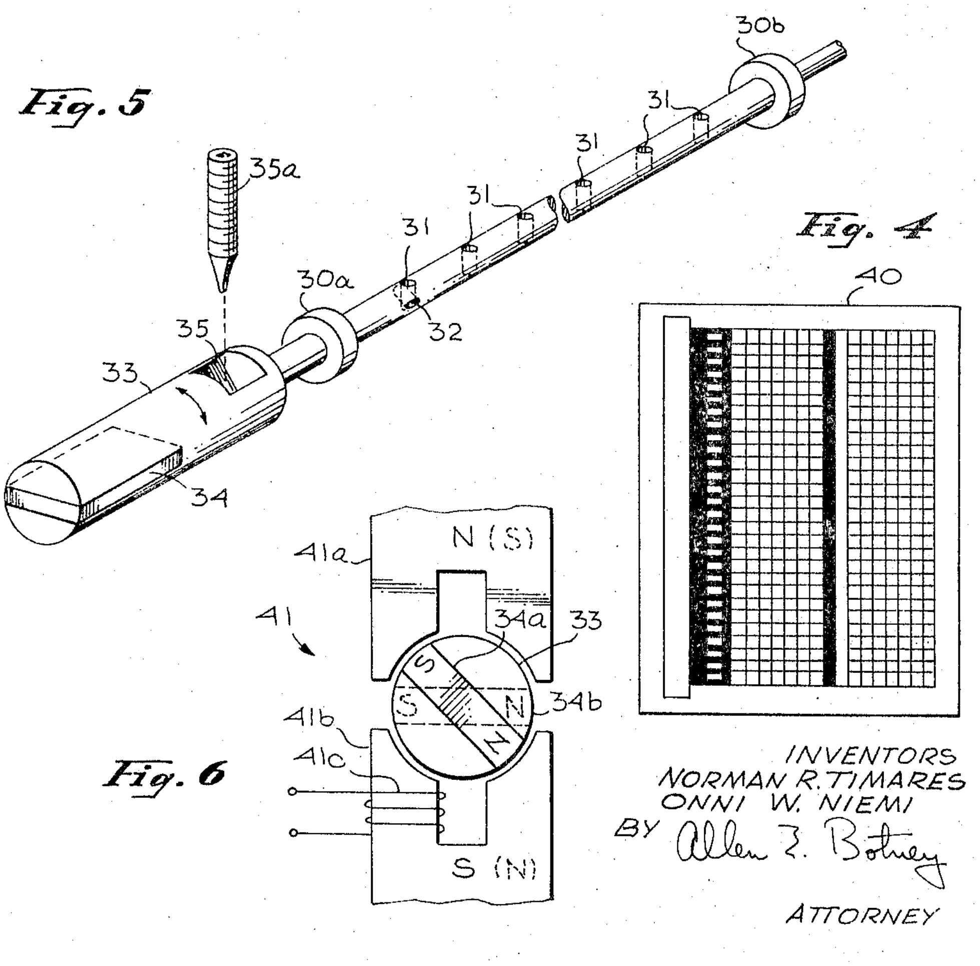
FIGURE 4 is a top view of a film compensating mask that is preferably included in the FIG. 3 apparatus.
FIGURE 5 is a perspective view of one type of rod that may be used in apparatus according to the present invention.
FIGURE 6 is an end view of a magnet element used in the FIG. 2 embodiment to control the motion of the rod shown in FIG. 5.

Considering the "row" and "column" rods in greater detail, attention is now directed not only to FIGS. 3 and 3(A) but to FIG. 5 as well wherein a rod that is typical of the kind used herein is shown. More specifically, rods 27 and 28 are rotationally mounted and, therefore, for this reason and as is shown in FIG. 5, their construction includes a pair of bearing mounts 30*a* and 30*b*. Furthermore, as is clearly shown in all three figures, each of rods 27 and 28 also has a plurality of holes through it between its bearing mounts 30*a* and 30*b*, the holes through the rod in FIG. 5 being designated 31 but the same holes being designated 27*a* and 28*a* in FIGS. 3 and 3(A) in order to provide a correspondence between the designations for the holes and the designations for the rods in which the holes are found.

With respect to these holes through the "column" and "row" rods, there are as many holes 27*a* through each one of "row" rods 27 as there are optical rods in each row of optical rods in integrator block 23. Furthermore, each "row" rod 27 also has a hole 27*a* through it for optical bar 23*c*, one for optical bar 23*g*, and one for the optical rod in opening 23*f*. Stated differently, there are as many holes through each "row" rod 27 as there are columns of optical rods in sections 23*a* and 23*b* in integrator block 23, plus three more holes to respectively take care of optical bars 23*c* and 23*g* and an optical rod in openings 23*f*. Thus, using the specific integrator block illustrated in FIG. 2 by way of example, each "row" rod 27 would have 17 holes through it. As for the holes through "column" rods 28, by using the same kind of reasoning or explanation, it will be seen that there are as many holes 28*a* through each of "column" rods 28 as there are optical rods in a column of optical rods in the integrator block or, stated differently, as many holes as there are rows of optical rods across the integrator block. Again using the integrator block in FIG. 2 by way of example, each "column" rod 28 would therefore have 28 holes through it.

The holes mentioned thus far as being through each rod all face or, stated differently, are all drilled through in the same direction, with the result that it can be said that they are parallel to each other. In addition, they are spaced from each other along the rod so as to lie directly beneath their associated optical rods or bars in the integrator block. Putting it more succinctly, the crossover points of rods 27 and 28 are in registration with the optical rods and bars of integrator block 23 and the holes 27*a* and 28*a* are located at these crossover points, with the result that the holes are likewise in registration with the optical rods and bars of the integrator block. And where rods 27 and 28 do not criss-cross, as in the case where there is no "column" rod 28 in association with the column of rectangular-shaped optical rods in openings 23*f*, the "row" rods 27 nevertheless have holes 27*a* where the crossover points would be if this "column" rod were not missing. Hence it can be seen that holes 27*a* and 28*a* are positioned along their respective rods so that they will be in registration with or, stated differently, so that they will fall directly between, holes 25*a* and 26*a* of masking plates 25 and 26. Consequently, if holes 27*a* and 28*a* are oriented in a line with holes 25*a* and 26*a* above and below them to form corresponding channels, then light from light source 24 would freely pass through them to integrator block 23. However, for reasons that will be more apparent later when the operation of this apparatus is described, holes 27*a* and 28*a* are not normally oriented in a line with holes 25*a* and 26*a*. Hence, light from light source 24 does not normally pass through holes 27*a* and 28*a*.

It is necessary to mention at this point that in the preferred embodiment of this invention, each one of "row" rods 27 includes two additional holes through it that are respectively associated with optical bars 23*c* and 23*g* and, therefore, are located along the rods so as to be in registration with these optical bars. Consequently, these two additional holes through "row" rods 27 respectively intersect the other two holes **27*a* through these rods at these points, the angle of intersection between them being such that these two additional holes will extend or be oriented in a line with the corresponding holes 25*a* and 26*a* when "row" rods 27 are in their normal position. One of these two additional holes through each of rods 27 is shown in FIG. 5 and is designated 32 therein. Thus, as may be seen from this figure, holes 32 intersect their associated pair of holes 31, the angle of intersection between them being such that holes 32 are normally oriented to pass light from light source 24 and will indeed pass such light should the corresponding or associated holes 28*a* in "column" rods 28 be similarly oriented. The reason for these two additional holes 32 through each of rods 27** will be more fully appreciated later.

As may also be seen from FIG. 5, each one of rods 27 and 28 also includes a cylindrically-shaped end section 33 in which is mounted a bar magnet 34 in a space provided therein. As will be seen more fully later, end sections 33 are mounted so that their bar magnets 34 are positioned between the pole faces of row magnets 20 and column magnets 21 shown in FIG. 2. The function of bar magnets 34 is to coact with electromagnets 20 and 21 so as to produce the forces necessary to rotate rods 27 and 28 to either align or misalign their holes **27*a* and 28*a*, as will be more fully explained below when the operation of this apparatus is taken up for discussion. Finally, each end section 33 of rods 27 and 28 includes an opening therein designated 35 in which is mounted a "stop" pin 35*a*, the purpose of these "stop" pins being to prevent excessive rotation of the "row" and "column" rods in response to the magnetic forces acting upon them. Accordingly, appropriate abutments are mounted in the apparatus for co-operation with these "stop" pins 35*a*, the aforesaid abutments not being shown in the figures because the use of such elements is well known and the details of their inclusion in the apparatus is well within the knowledge of anyone mechanically skilled. It was therefore deemed expedient to leave them out of the drawings for sake of clarity. Suffice it to say, therefore, that these abutments are mounted so as to limit the angles of rotation of rods 27 and 28 in order to obtain the desired speed of operation and also to insure that holes 27*a* and 28*a*** through these rods would become properly aligned in the manner previously described.

Returning once again to FIGS. 3 and 3(A), the apparatus therein is also shown to include a film compensating mask 40 mounted between the input face of integrator block 23 and mask 25. A top or full view of compensating mask 40 is presented in FIG. 4 and the purpose of this compensating mask is, as its name implies, to eliminate or minimize differences in the light selectively passed through mask 25 to optical integrator block 23. Hence, the format or appearance of film mask 40 is the same as that for the faces of integrator block 23, as can be seen from a comparison between film mask 40 in FIG. 4 and the face of integrator block 23 in FIG. 2. Needless to say, therefore, the film mask is in registration with the integrator block at its input in and is transparent wherever the integrator block is transparent and opaque wherever the integrator block is opaque.

To complete the description of the construction of the subject embodiment, reference is now made to FIG. 6 wherein an end view of an electromagnet is shown of the kind that may be used for the "row" and "column" magnets 20 and 21, respectively, in FIG. 2. The electromagnet in FIG. 6 is generally designated 41 and its poles are therefore designated **41*a* and 41*b*, the coil wound around one of the poles being designated 41*c*. An end section 33 of either a "row" or "column" rod 27 or 28, respectively, is mounted between the faces of poles 41*a* and 41*b*, with the result that the associated bar magnet 34 is also positioned between the pole faces. Furthermore, since these "row" and "column" rods are rotatably mounted, as was previously mentioned, it will be recognized that section 33 and bar magnet 34 therein are likewise rotatable, the extent of the rotation being limited by the "stop" pin, as aforesaid. The quiescent or normal position of the bar magnet is indicated by the designation 34*a* in FIG. 6 and its rotated position, which is shown by the bar magnet in broken lines, is designated 34*b*. As may be expected, the ends of coil 41*c* are connected to electronic pulse circuitry 22 which selectively sends electrical current pulses through the coil to alter the polarity of poles 41*a* and 41*b* and, therefore, to correspondingly alter the position of bar magnet 34**.

More specifically, the polarity of poles **41*a* and 41*b* is normally such that pole 41*a* is a North pole and pole 41*b* is a South pole, with the result that bar magnet 34 is normally attracted by these poles to its position 34*a*. It is in this position of the bar magnet that holes 27*a* and 28*a* through the "row" and "column" rods, respectively, are misaligned to prevent light from source 24 from passing through. However, when an appropriate pulse is applied to coil 41*c*, the polarity of poles 41*a* and 41*b* is thereby reversed, with the result that pole 41*a* now becomes a South pole and pole 41*b* becomes a North pole, as is indicated by the broken-line S and N in FIG. 6. Under these conditions, bar magnet 34 is repelled in a counter-clockwise direction until it reaches its position at 34*b*, at which time it is held in that position by the abutment of its associated stop pin 35*a*. It will be recognized that in this position of the bar magnet holes 27*a* and 28*a* are aligned with each other and with holes 25*a* and 26*a* to form the channels that will pass the light from light source 24**.

Although a particular arrangement or construction of the invention has been illustrated and described above, it will be recognized by those skilled in the art that various modifications and alterations are possible. It was intended, therefore, that the specifically illustrated and described apparatus be by way of example and not have any limiting effect on the invention. Accordingly, the invention should be considered to include any and all modifications, alterations or equivalent arrangements falling within the scope of the annexed claims.

Considering now its operation, it will be remembered that "row" rods 27 and "column" rods 28 are normally positioned so that their respective holes **27*a* and 28*a* are initially oriented away from or at an angle with holes 25*a* and 26*a* in masking plates 25 and 26, with the exception, however, of the two additional holes 32 (see FIG. 5) through each of "row" rods which, it will also be remembered, are initially aligned with their corresponding holes 25*a* and 26*a*. Hence, when the two "column" magnets 21 respectively coupled to the two "column" rods 28 positioned beneath transparent bars 23*c* and 23*g* are energized by electronic pulse circuitry 22, these two "column" rods are rotated in the manner and for the reasons previously explained, with the result that light from light source 24 passes through the rods and plates as well as through film compensating mask 40 to become incident upon transparent bars 23*c* and 23*g* along their entire lengths. Thus, bars 23*c* and 23*g* are both entirely illuminated in a single instance or step, with the result that opaque bars 14 and 16*b* (see FIG. 1) are likewise recorded in their entirety on film frame 10** in a single instance or step.

Thereafter, starting at one end and proceeding toward the other end, "row" magnets 20 are energized in succession by electronic pulse circuitry 22, with the result that "row" rods 27 are likewise rotated in succession until their holes **27*a* are respectively aligned with holes 25*a* and 26*a* through the masking plates. As this is done, that is to say, as each "row" rod is rotated to bring its holes into alignment, the appropriate "column" magnets 21 are simultaneously energized by circuitry 22 to thereby also bring the holes of the affected "column" rods 28 into alignment and, as this occurs, the thusly aligned holes will pass the light from light source 24 through film compensating mask 40 to integrator block 23 wherein the appropriate transparent and square-shaped rods will propogate the light to the code block area on film frame 10. Following each energization of the magnets, the "row" and "column" rods return to their normal or quiescent positions so that no further light is permitted through them. It is in this way that a complete block of code of the kind shown in FIG. 1 by way of example, is recorded on a frame of film, the opaque areas resulting from the incidence of light thereon and the transparent areas resulting from the fact that they were not exposed to the light. It is thus seen that the operation of magnets 20 and 21, and rods 27 and 28** is a shutter-type of operation.

Having thus described the invention, what is claimed is:

1. Apparatus for producting a block of code on a storage medium in response to electrical pulses applied thereto, said aparatus comprising: first and second sets of movably mounted rods arranged in parallel first and second layers, respectively, the rods in said first set oriented to criss-cross with the rods in said second set; means at each crossover point of said first and second set of rods for producing an element of a code block when in alignment with each other, said means being normally out of alignment; and means coupled to said rods for selectively moving them in response to the electrical pulses to selectively align said element producing means so as to produce an element of a code block at a physical location corresponding to the crossover point at which alignment takes place.

2. Apparatus for producing a block of code on a light sensitive storage medium, said apparatus comprising: a pair of spaced masking plates mounted parallel to each other and having equal numbers of holes through them that are in registration with each other, said masking plate holes being arranged in columns and rows; a source of light mounted adjacent one of said plates for passing light through the holes thereof; and shutter means individual to each hole mounted in the space between said masking plates for permitting light from said light source to pass through selected registered holes, wherein said shutter means includes a first layer of rotatable rods mounted parallel to each other and a second layer of rotatable rods mounted parallel to each other, the rods in said first layer criss-crossing with the rods in said second layer with the crossover points therebetween being in registration with the holes through said masking plates, said criss-crossing rods respectively having holes through them at each of said crossover points for selectively passing said light in response to the rotation of said rods; and apparatus for selectively rotating said rods.

3. The apparatus defined in claim 2 wherein said apparatus includes an electromagnet for each of said rods, said electromagnets being mounted so that the ends of said rods respectively extend between the poles of said electromagnets; and permanent bar magnets respectively mounted in the ends of said rods that extend between the poles of said electromagnets.

4. Apparatus for producing a block of code on a light sensitive storage medium in response to a train of electrical pulses applied thereto that corresponds to the block of code, said apparatus comprising: a first layer of rotatable rods mounted parallel to each other and a second layer of rotatable rods mounted parallel to each other, the rods in said first layer criss-crossing with the rods in said second layer, said first and second layers of rods having holes through them at the crossover points that are normally oriented to prevent light from passing through them; means for directing light at each of said crossover points in a direction that will permit the light to pass through the holes thereat when they are properly aligned; and motors respectively coupled to said rods for selectively rotating them in response to electrical pulses applied thereto to selectively align the holes therethrough, whereby light is selectively passed through said rods.

5. The apparatus defined in claim 4 wherein said motors respectively include electromagnets and permanent bar magnets rotatably mounted between the poles of said electromagnets and coupled to said rods, the polarity of the poles of said electromagnets varying according to the polarity of the electrical pulses applied thereto.

6. The apparatus defined in claim 4 wherein said means includes a source of light, and a masking plate interposed between said light source and said layers of rods, said masking plate being parallel to said layers of rods and having holes therethrough that are respectively in registration with the crossover points of said rods.

7. Apparatus for converting a block of code in a first format to a block of code in a second format in response to a train of electrical pulses applied thereto that corresponds to the block of code in said first format, said apparatus comprising: an optical block that includes a plurality of light-propagating rods stacked to pass light from one end thereof to the other end thereof in the second format; a pair of spaced masking plates mounted parallel to each other and having equal numbers of holes therethrough that are in registration with each other, the number of holes through each of said plates being equal to the number of light-propagating rods in said optical block and arranged in the same format, said plates being positioned so that one of them is contiguous to said optical block with the holes thereof in registration with said light-propagating rods; a source of light mounted adjacent the other of said pair of masking plates and on the outside thereof; and shutter means mounted in the space between said masking plates for permitting light from said light source to pass through selected registered holes, wherein said shutter means includes a first layer of rotatable rods mounted parallel to each other and a second layer of rotatable rods mounted parallel to each other, the rods in said first layer criss-crossing with the rods in said second layer with the crossover points therebetween being in registration with the holes through said masking plates, said criss-crossing rods respectively having holes through them at each of said crossover points for selectively passing said light in response to the rotation of said rods; and apparatus for selectively rotating said rods in response to the electrical pulses to move the holes thereof into alignment.

8. The apparatus defined in claim 7 wherein said means are motors, one motor to a rod, each motor including an electromagnet mounted so that an end of its associated rod extends between the poles thereof, and a permanent bar magnet mounted in the end of said associated rod that extends between the poles of the electromagnet.

References Cited

UNITED STATES PATENTS

| | | | |
|---|---|---|---|
| 2,008,150 | 7/1935 | Nelson | 70—50 |
| 2,605,965 | 8/1952 | Shepherd | 235—61.6 |
| 2,774,821 | 12/1956 | Brown | 179—18 |
| 3,085,231 | 4/1963 | Linder | 340—173 |
| 3,270,613 | 9/1966 | Glenn | 88—24 |

MAYNARD R. WILBUR, *Primary Examiner.*

J. H. WALLACE, Jr., *Assistant Examiner.*